(12) United States Patent
Miyagi et al.

(10) Patent No.: US 9,355,125 B2
(45) Date of Patent: May 31, 2016

(54) OPERATION MANAGEMENT SUPPORT DEVICE, OPERATION MANAGEMENT SUPPORT METHOD, AND RECORDING MEDIUM

(71) Applicant: Fujitsu Limited, Kawasaki-shi, Kanagawa (JP)

(72) Inventors: Toshihide Miyagi, Kawasaki (JP); Yuu Masuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 493 days.

(21) Appl. No.: 13/849,746

(22) Filed: Mar. 25, 2013

(65) Prior Publication Data

US 2014/0006432 A1 Jan. 2, 2014

(30) Foreign Application Priority Data

Jun. 29, 2012 (JP) ................................. 2012-147370

(51) Int. Cl.
*G06F 7/00* (2006.01)
*G06F 17/30* (2006.01)
(Continued)

(52) U.S. Cl.
CPC ............ *G06F 17/30283* (2013.01); *G06F 8/71* (2013.01); *G06F 17/30395* (2013.01); *G06Q 10/06* (2013.01)

(58) Field of Classification Search
CPC .................... G06F 17/30283; G06F 17/30395
See application file for complete search history.

(56) References Cited

U.S. PATENT DOCUMENTS

2010/0306275 A1  12/2010  Maheshwari et al.
2011/0302187 A1  12/2011  Otsuka et al.
2012/0226717 A1   9/2012  Maheshwari et al.

FOREIGN PATENT DOCUMENTS

JP    2011-257812     12/2011

OTHER PUBLICATIONS

Shinji Kikuchi et al, "Configuration Procedure Synthesis for Complex Systems Using Model Finder," Engineering of Complex Computer Systems (ICECCS), 2010 15th IEEE international Conference on Mar. 22, 2010, pp. 95-104, XP031795527, ISBN: 978-1-4244-6638-2.*

(Continued)

*Primary Examiner* — Usmaan Saeed
*Assistant Examiner* — Paul Kim
(74) *Attorney, Agent, or Firm* — Oblon, McClelland, Maier & Neustadt, L.L.P.

(57) ABSTRACT

A method includes when an management flow made of a combination of management components for performing given management actions on an apparatus targeted for management is created, and a parameter specifying a search condition for searching for a specific piece of configuration information of the apparatus from a configuration management database having the configuration information registered therein is set for the management component included in the created management flow, acquiring an arrangement of element information leading to element information in which the parameter is settable as attribute information from the configuration management database, based on the set parameter, generating search condition information for searching for the configuration information in which the parameter is set as attribute information, from the acquired arrangement of element information; and, adding the generated search condition information to the management component included in the created management flow.

15 Claims, 17 Drawing Sheets

(51) Int. Cl.
*G06F 9/44* (2006.01)
*G06Q 10/06* (2012.01)

(56) References Cited

OTHER PUBLICATIONS

Extended European Search Report issued Sep. 25, 2013 in Patent Application No. 13162301.9.

Shinji Kikuchi, et al., "Configuration Procedure Synthesis for Complex Systems Using Model Finder," 2010 15th IEEE International Conference on Engineering of Complex Computer Systems, XP 031795527, Mar. 22, 2010, pp. 95-104.

Kaoutar El Maghraoui, et al., "Model Driven Provisioning: Bridging the Gap Between Declarative Object Models and Procedural Provisioning Tools," Middleware 2006 Lecture Notes in Computer Science, XP 019051058, Jan. 1, 2006, pp. 404-423.

* cited by examiner

FIG. 5A

| INPUT INFORMATION | OUTPUT INFORMATION |
|---|---|

INPUT INFORMATION
(*) INDICATES MANDATORY ITEM

| NAME | SOURCE |
|---|---|
| *hostname | [VALUE] |
| *commandline | [VALUE] |
| ⊟ OPTION | |
| connectiontype | [VALUE] |
| acqport | [VALUE] |
| ostype | [VALUE] |
| username | [VALUE] |
| password | [VALUE] |
| execusername | [VALUE] |
| execpassword | [VALUE] |
| timeout | [VALUE] |

| NAME | SOURCE | |
|---|---|---|
| *hostname | [VALUE] | |
| *wuname | [VALUE] | |
| ⊟ OPTION | | |
| systemname | [VALUE] | |
| mwtype | [VALUE] | Interstage Application Server (IAPS) |
| mwinstalledpath | [VALUE] | |
| ostype | [VALUE] | Windows |
| username | [VALUE] | |
| password | [VALUE] | |
| execusername | [VALUE] | |
| execpassword | [VALUE] | |
| timeout | [VALUE] | |
| retry | [VALUE] | |
| retry_interval | [VALUE] | |

| OS INFORMATION ||
|---|---|
| ATTRIBUTE | VALUE |
| OS BUILD NUMBER | |
| CODE SYSTEM | |
| OS NAME | Windows |
| OS TYPE | |
| OS PRODUCT ID | |
| COMPANY NAME | |
| SERVICE PACK | |

FIG. 6

| ELEMENT | PARENT ELEMENT | CONFIGURATION INFORMATION | CONFIGURATION INFORMATION TYPE |
|---|---|---|---|
| LogicalServer | | id | ATTRIBUTE |
| | | ipaddress | ATTRIBUTE |
| | | hostname | ATTRIBUTE |
| | | SystemSettings | ELEMENT |
| SystemSettings | LogicalServer | Network | ELEMENT |
| | | OSSetting | ELEMENT |
| | | UserSetting | ELEMENT |
| OSSetting | SystemSettings | name | ATTRIBUTE |
| | | buildeNumber | ATTRIBUTE |

FIG. 10A

```
<ns0:LogicalServer id"001" ipAddress"*.*.*" hostname="*.*.*">
. . .
<ns0:SystemSettings> <ns0:OSSetting name="Windows"/> </ns0:SystemSettings>
. . .
</ns0:LogicalServer>
```

FIG. 10B

```
/LogicalServer/SystemSettings/OSSetting[matches(@name,'Windows')]
```

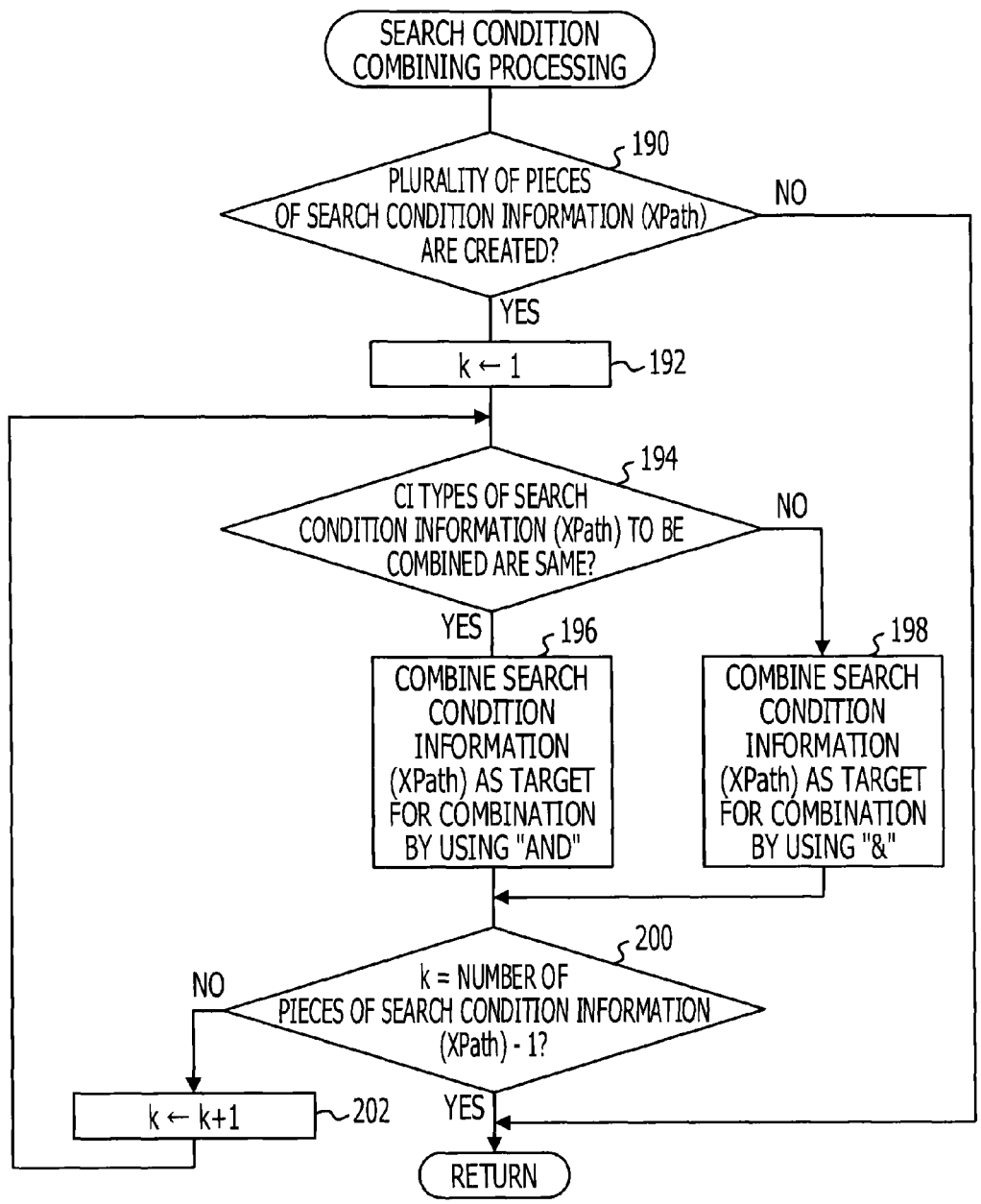

FIG. 12A

| INPUT INFORMATION (*) INDICATES MANDATORY ITEM | |
|---|---|
| NAME | SOURCE |
| *hostname | [VALUE] |
| ⊟ OPTION | |
| ipmiipaddress | [VALUE] |
| ipmiusername | [VALUE] |
| ipmipassword | [VALUE] |
| multiplicity | [VALUE] |
| operationmode | [VALUE] |
| timeout | [VALUE] |
| retry | [VALUE] |
| retry_interval | [VALUE] | ipmiipaddress → ASSOCIATED WITH ATTRIBUTE OF LOGICAL NODE (LogicalServer)

ipmiusername, ipmipassword → ASSOCIATED WITH ATTRIBUTE OF LOGICAL NODE (LogicalServer)

/%LogicalServer[(/LogicalServer/LogicalServerConfiguration/IPMI[matches(@userNanme,'user1')])]

XPath FOR SEARCHING FOR ipmiusername and(/LogicalServer/LogicalServerCongiguration/IPMI[matches(@password,'pass1')])]

XPath FOR SEARCHING FOR ipmipassword

FIG. 13A

| INPUT INFORMATION | OUTPUT INFORMATION |
|---|---|

INPUT INFORMATION
(*) INDICATES MANDATORY ITEM

| NAME | SOURCE |
|---|---|
| *hostname | [VALUE] |
| *wuname | [VALUE] |
| ☐ OPTION | |
|    operationtype | [VALUE] |
|    systemname | [VALUE] |
|    mwtype | [VALUE] |
|    mwinstalledpath | [VALUE] |
|    ostype | [VALUE] |
|    username | [VALUE] |
|    password | [VALUE] |
|    execusername | [VALUE] |
|    execpassword | [VALUE] |
|    timeout | [VALUE] |
|    retry | [VALUE] |
|    retry_interval | [VALUE] |

→ ASSOCIATED WITH ATTRIBUTE OF INSTALLED SOFTWARE (InstalledSoftware)

→ ASSOCIATED WITH ATTRIBUTE OF LOGICAL NODE (LogicalServer)

/%LogicalServer[(/LogicalServer/SystemSettings/OSSetting[matchies(@Nanme,'Windows')])]

XPath FOR SEARCHING FOR ostype

[(./&*/%InstalledSoftware[/InstalledSoftware[matches(@name,'Software')]])]

XPath FOR SEARCHING FOR mwtype

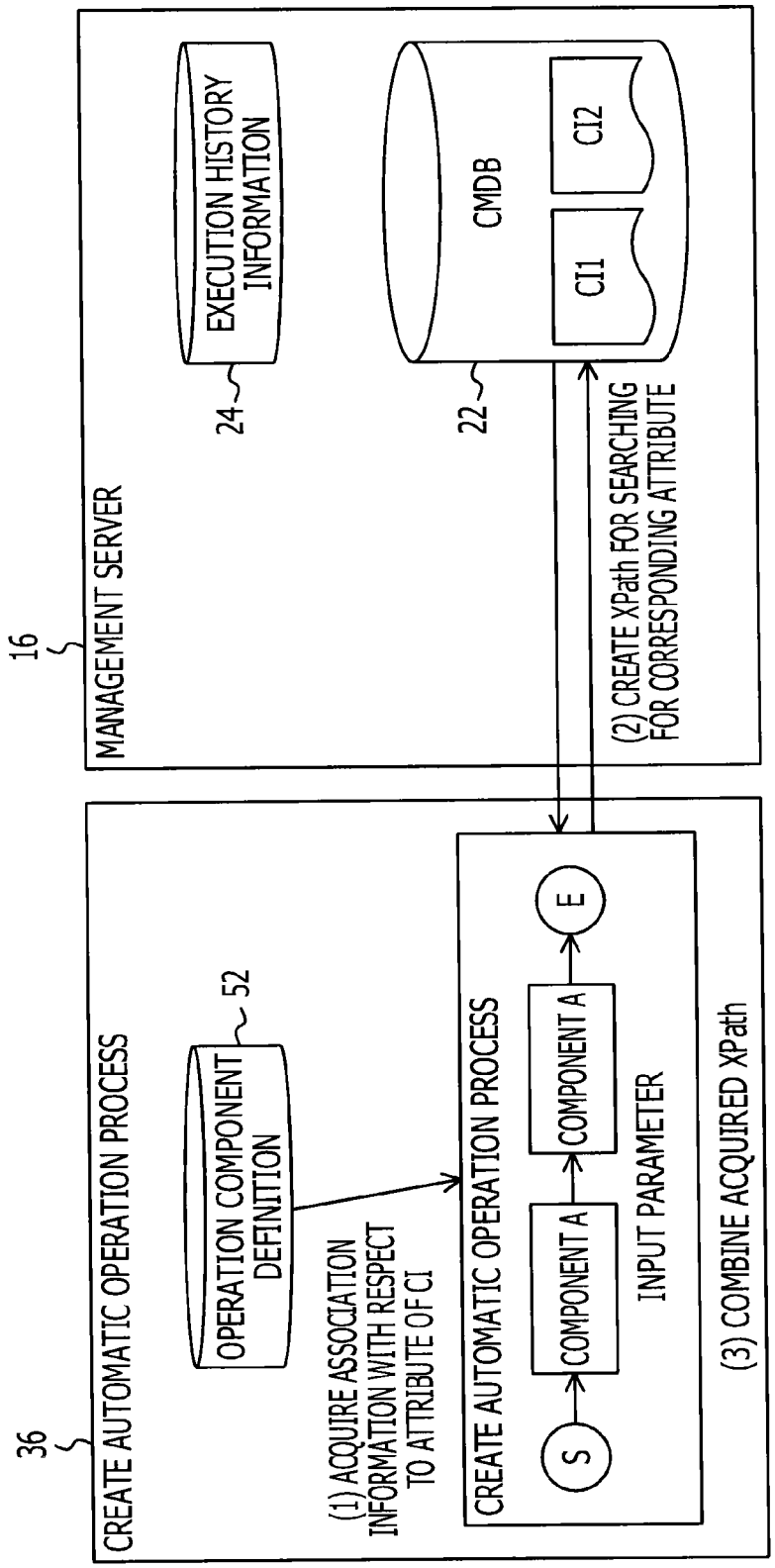

FIG. 15

| NUMBER OF TIMES | OPERATION COMPONENT A | | |
|---|---|---|---|
| | hostname | service | ostype |
| 1 | 192.168.11.120 | Service1 | Windows |
| 2 | 192.168.11.30 | Service2 | Windows |
| 3 | 192.168.11.120 | Service3 | Linux |
| 4 | 192.168.11.67 | Service1 | Windows |
| 5 | 192.168.11.30 | Service4 | Linux |
| 6 | 192.168.11.120 | Service1 | Linux |
| 7 | 192.168.11.67 | Service3 | Linux |
| 8 | 192.168.11.120 | Service2 | Windows |
| 9 | 192.168.11.67 | Service4 | Windows |
| 10 | 192.168.11.120 | Service3 | Windows |

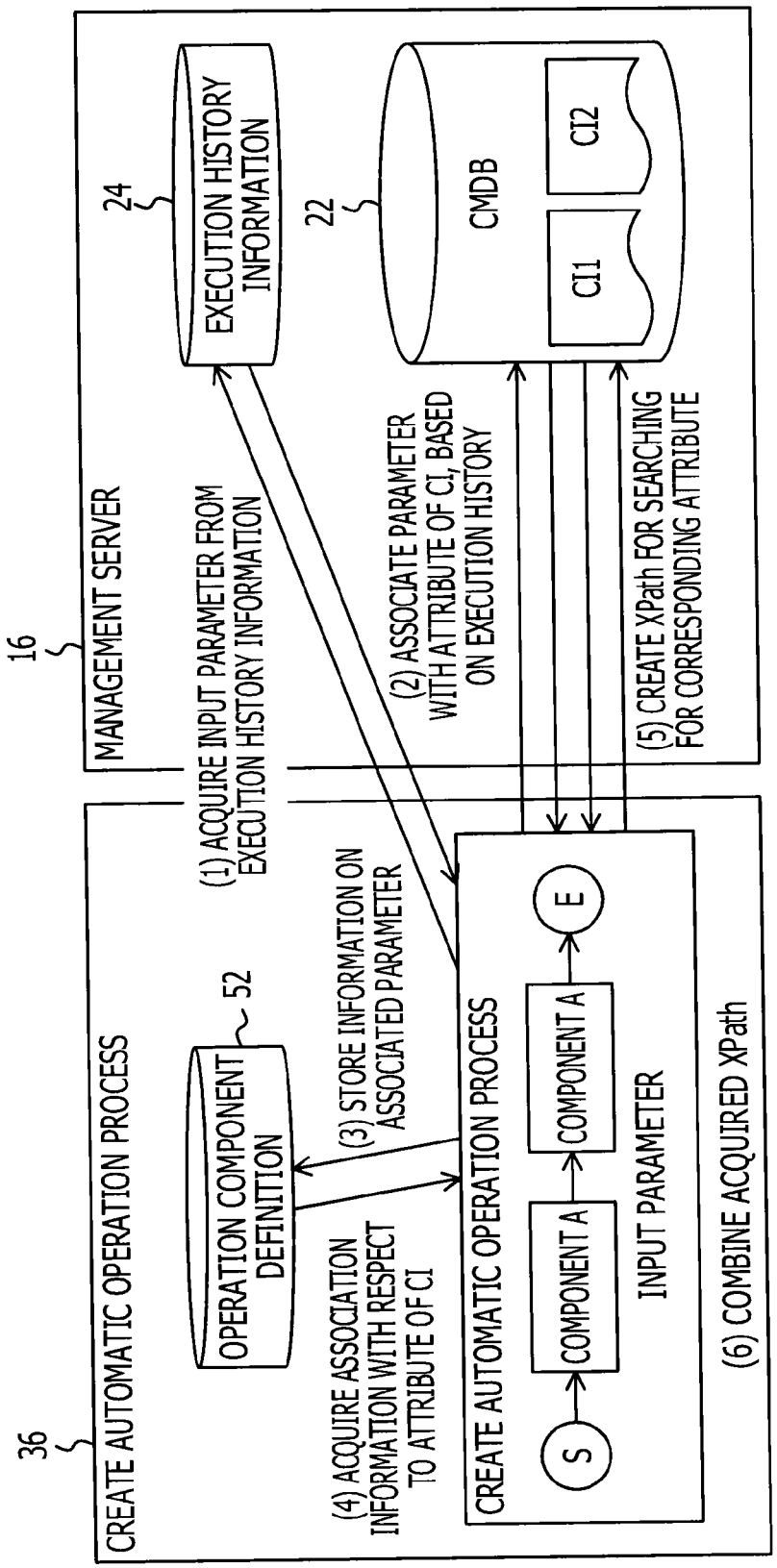

OPERATION MANAGEMENT SUPPORT DEVICE, OPERATION MANAGEMENT SUPPORT METHOD, AND RECORDING MEDIUM

CROSS-REFERENCE TO RELATED APPLICATION

This application is based upon and claims the benefit of priority of the prior Japanese Patent Application No. 2012-147370, filed on Jun. 29, 2012, the entire contents of which are incorporated herein by reference.

FIELD

The embodiment discussed herein is related to an operation management support device, an operation management support method, and a recording medium.

BACKGROUND

Operation management software which provides a function of automatically performing operation management of an information processing apparatus is known. Operation management software provides a user with a plurality of types of operation management components which perform mutually different operation management actions of an information processing apparatus targeted for operation management. A user creates an operation management flow (automatic operation process) by appropriately combining the plurality of types of operation management components, which are provided by the operation management software, and causes the created operation management flow to be executed, thereby performing a desired operation management action on the information processing apparatus targeted for operation management.

Some operation management components provided by the operation management software acquire configuration information of the information processing apparatus targeted for operation management from a configuration management database (CMDB) containing the configuration information registered therein, and use the acquired configuration information for operation management actions. Search condition information used for acquisition of the configuration information from the configuration management database is expressed in a notation compliant with XML Path Language (XPath). The search condition information mentioned above has been manually created by a user having knowledge of XPath and an understanding of the structure of a configuration management database. Alternatively, the above search condition information has been created in such a way that a user having an understanding of the structure of the configuration management database inputs a search condition for configuration information to be acquired to a console which controls the configuration management database.

The following technique, which is relevant to the above, has been proposed. That is, configuration item information contained in a query formula used to search for configuration item information indicating a configuration item targeted for management is compared to table information contained in history information of queries made to a relational database, and correspondence information is generated. Relational information indicating a relationship between configuration items contained in the query formula is compared to information indicating a relationship between tables contained in the query history information, and correspondence information is generated. Then, a schema definition of the configuration item information and a schema definition of the relational information are generated by using the generated correspondence information.

Japanese Laid-open Patent Publication No. 2011-257812 discloses such a technique.

SUMMARY

According to an aspect of the invention, a method includes when an management flow made of a combination of management components for performing given management actions on an apparatus targeted for management is created, and a parameter specifying a search condition for searching for a specific piece of configuration information of the apparatus from a configuration management database having the configuration information registered therein is set for the management component included in the created management flow, acquiring an arrangement of element information leading to element information in which the parameter is settable as attribute information from the configuration management database, based on the set parameter, generating search condition information for searching for the configuration information in which the parameter is set as attribute information, from the acquired arrangement of element information; and, adding the generated search condition information to the management component included in the created management flow.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are images illustrating example parameter input screens;

FIG. 5C is an image illustrating an example display screen of information registered in a configuration management database;

FIG. 6 is a chart illustrating an example overview of information registered in the configuration management database;

FIG. 10A illustrates example information registered in the configuration management database;

FIG. 10B is a schematic illustration of example search condition information (XPath);

FIG. 11 is a flowchart illustrating example search condition combination processing;

FIGS. 12A and 12B are schematic illustrations for explaining search condition combination processing;

FIGS. 13A and 13B are schematic illustrations for explaining the search condition combination processing;

FIG. 14 is a conceptual image illustrating an outline of processing in the case where a parameter of an operation component is associated in advance with a CI attribute of the configuration management database;

FIG. 15 is a chart illustrating an example content of execution history information; and FIG. 16 is a conceptual image illustrating an outline of processing in the case where a parameter of an operation component is not associated in advance with a CI attribute of the configuration management database.

DESCRIPTION OF EMBODIMENT

Initially, the inventors' studies may indicate that even if operation management flows include the same operation management component which uses configuration information acquired from the configuration management database for the operation management actions, the configuration information which the operation management component uses may vary from one operation management flow to another. For example, for an operation management flow in which a Windows (registered trademark) server is to be operated, configuration information of the Windows (registered trademark) server has to be acquired, whereas, for an operation management flow in which a Linux (registered trademark) server is to be operated, configuration information of the Linux (registered trademark) server has to be acquired.

Accordingly, at the time of creating an operation management flow including an operation management component using configuration information to be acquired from the configuration management database, search condition information for acquisition of the configuration information is to be created or modified even if another operation management flow including the same operation management component already exists. In order to create or modify search condition information, a user has to have knowledge of XPath and an understanding of the structure of the configuration management database. Therefore, there has been a problem in that it takes much time and effort to create an operation management flow.

Figure 1:
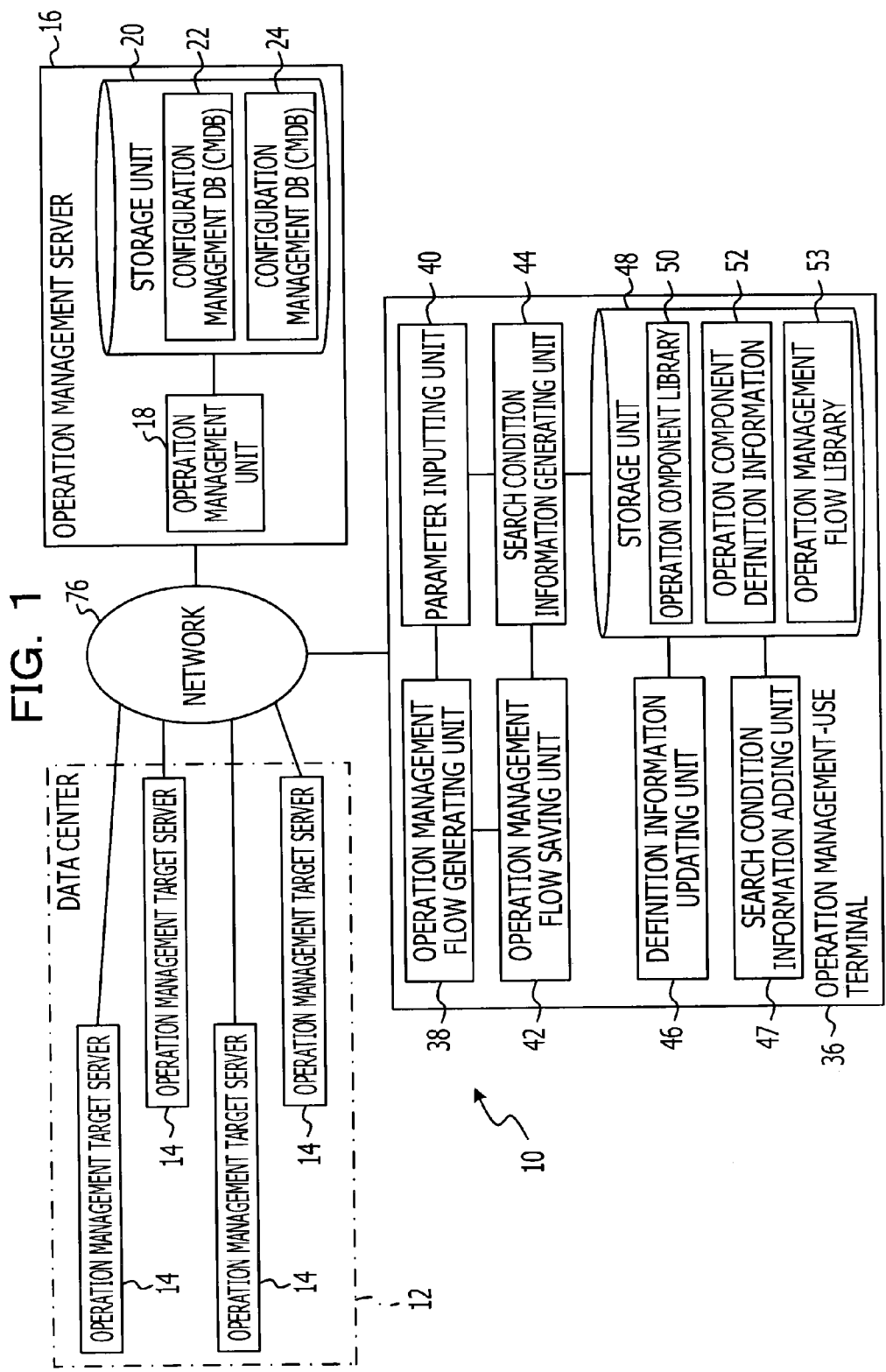
FIG. 1 illustrates a functional block diagram of a computer system described in an embodiment.

Hereinafter, an example embodiment of the disclosed technique will be described in detail with reference to the drawings. FIG. 1 illustrates a computer system 10 according to this embodiment. The computer system 10 includes a plurality of servers 14 targeted for operation management (hereinafter referred to as "operation management target servers 14") located in a data center 12, an operation management server 16, and an operation management-use terminal 36. The operation management target servers 14, the operation management server 16, and the operation management-use terminal 36 are each coupled to a network 76. Note that servers of different types of operating systems (OSs) may be mixed among the plurality of operation management target servers 14 located in the data center 12. The operation management target serve 14 is an example of an information processing apparatus targeted for operation management in the disclosed technique.

The operation management server 16 includes an operation management unit 18 and a storage unit 20. The operation management unit 18 provides a function of automatically performing operation management of the operation management target servers 14 to a user. In this embodiment, an operation management flow which specifies operation management actions to be carried out on the operation management target servers 14 is created in the operation management-use terminal 36, and the created operation management flow is uploaded from the operation management-use terminal 36 to the operation management server 16. The operation management unit 18 carries out various types of operation management actions, which are specified by the operation management flow uploaded from the operation management-use terminal 36, on the operation management target servers 14.

A configuration management database (CMDB) 22 in which configuration information of each operation management target server 14 located in the data center 12 is registered and execution history information 24 indicating the history of execution of operation components (described below) are stored in the storage unit 20. Note that the configuration information registered in the configuration management database 22 has such a structure that individual pieces of element information are arranged hierarchically such as "LogicalServer"->"SystemSettings"->"OSSetting"->"name" illustrated as an example in FIG. 6. The storage unit 20 is an example of a second storage unit in the disclosed technique.

Commands to be transmitted to the operation management target servers 14 at the time of carrying out operation management actions of the operation management target servers 14 differ depending on the types of OSs which are running on individual operation management target servers 14, for example. Accordingly, when carrying out an operation management action on the operation management target server 14, the operation management unit 18 refers to the configuration information of the server 14 to be operated which is registered in the configuration management database 22, and transmits a command according to the type of the running OS to carry out the operation management action. This enables operation management actions of the individual operation management target servers 14 to be carried out using the same operation management flow independently of differences in configuration, such as the types of OSs running on individual operation management target servers 14. Note that the operation management unit 18 continuously monitors a change in the configuration of each operation management target server 14 located in the data center 12, and, upon detecting a change in the configuration, performs processing of changing the corresponding configuration information registered in the configuration management database 22 so as to be in accordance with the changed configuration.

The operation management-use terminal 36 is an example of an operation management support device according to the disclosed technique, and includes an operation management flow generating unit 38, a parameter inputting unit 40, an operation management flow saving unit 42, a search condition information generating unit 44, a definition information updating unit 46, a search condition information adding unit 47, and a storage unit 48. The storage unit 48 stores a library 50 in which a plurality of types of operation components, which are components for creating an operation management flow, are registered, operation component definition information 52 defining attributes of individual operation components registered in the library 50, and a library 53 in which the operation management flow is registered. The storage unit 48 is an example of a first storage unit in the disclosed technique. Each operation component registered in the library 50 includes a program for causing the operation management server 16 to carry out unit actions included in an operation management action. In this embodiment, combining a plurality of types of operation components creates an operation management flow which allows a desired operation management action on the operation management target server 14 to be carried out by the operation management server 16.

Figure 4:
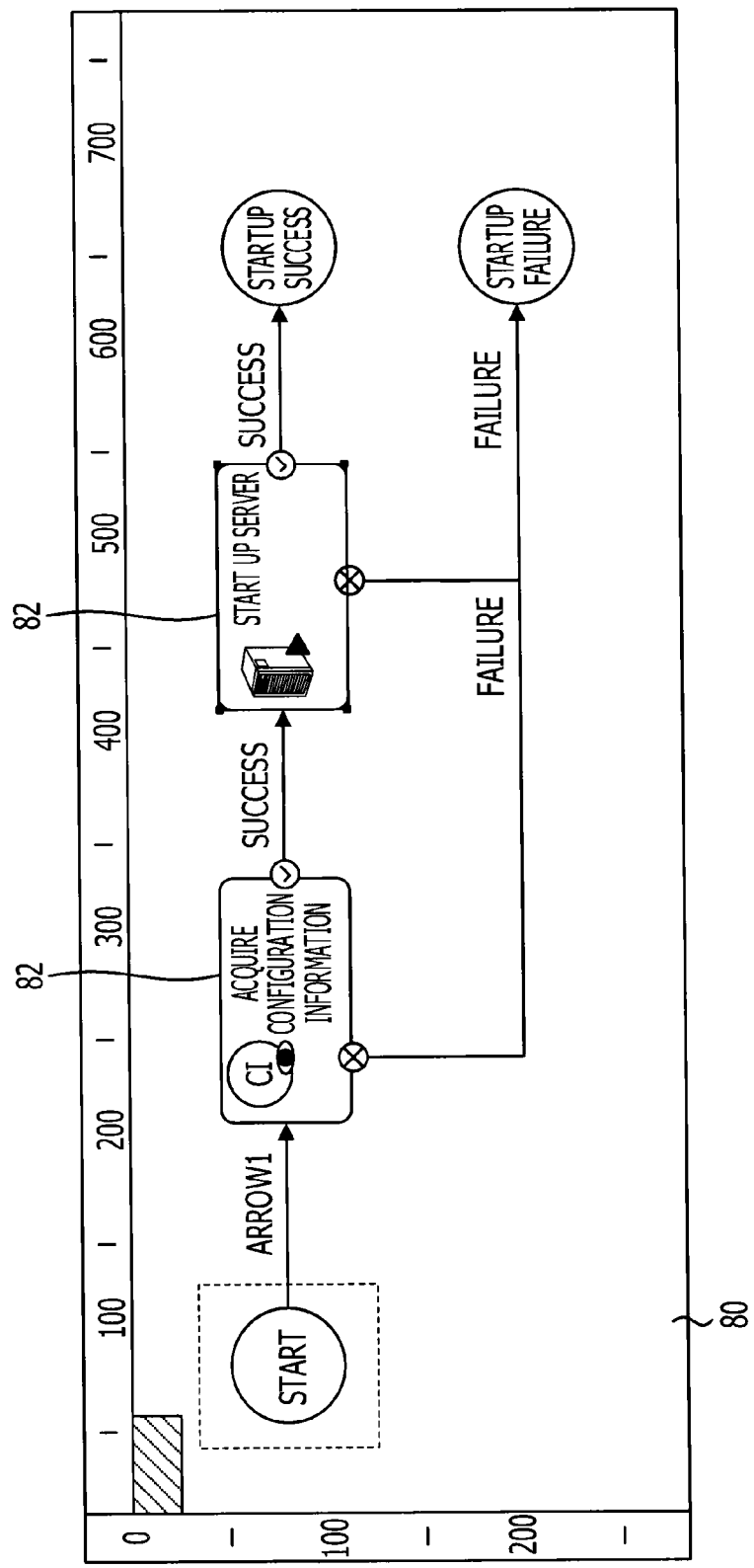
FIG. 4 is a conceptual image illustrating an example operation management flow creation screen.

The operation management flow generating unit 38 performs processing of supporting creation of an operation management flow by a user. Processing of displaying an operation management flow creation screen 80 as illustrated in FIG. 4, for example, and arranging operation components 82 selected by a user on the operation management flow creation screen 80 is included in the processing of supporting creation of an operation management flow to be performed by the operation management flow generating unit 38. Processing such as drawing a line which couples the operation components 82 arranged on the operation management flow creation screen 80 is also included. Note that the operation components 82 with the wording "Acquire configuration information" and the wording "Start up server" illustrated in FIG. 4 each contain a program for causing the corresponding unit operations to be carried out by the operation management server 16. Although an operation component is created in advance and the operation component being registered in the library 50 is provided to a user, the user itself may create a desired operation component.

The parameter inputting unit 40 performs processing of supporting input of a parameter to an operation component included in an operation management flow created by a user. Processing such as displaying a parameter input screen 84 as illustrated in FIG. 5A, for example, is included in the processing of supporting input of a parameter to be performed by the parameter inputting unit 40. Note that when the created operation management flow is a flow for carrying out operation management actions targeting some of the plurality of operation management target servers 14, the parameter mentioned above is input to an operation component in order to narrow down the operation management target servers 14 on which operation management actions are to be carried out. The operation management flow saving unit 42 performs processing of saving an operation management flow created by a user.

When an operation management flow is generated by a user, the search condition information generating unit 44 performs processing of generating search condition information for searching for configuration information in which a parameter input by the user is set as attribute information among configuration information registered in the configuration management database 22. Note that the above search condition information is expressed in a notation compliant with XPath. When information of associating an input parameter of an operation component with any element information of configuration information of the configuration management database 22 does not exist in the operation component definition information 52, the definition information updating unit 46 performs processing of adding the above information to the operation component definition information 52. The search condition information adding unit 47 performs processing of adding search condition information generated by the search condition information generating unit 44 to an operation component for acquiring configuration information from the configuration management database 22.

Note that the search condition information generating unit 44 is an example of a generating unit in the disclosed technique, the search condition information adding unit 47 is an example of an adding unit in the disclosed technique, and the definition information updating unit 46 is an example of an updating unit in the disclosed technique.

Figure 2:
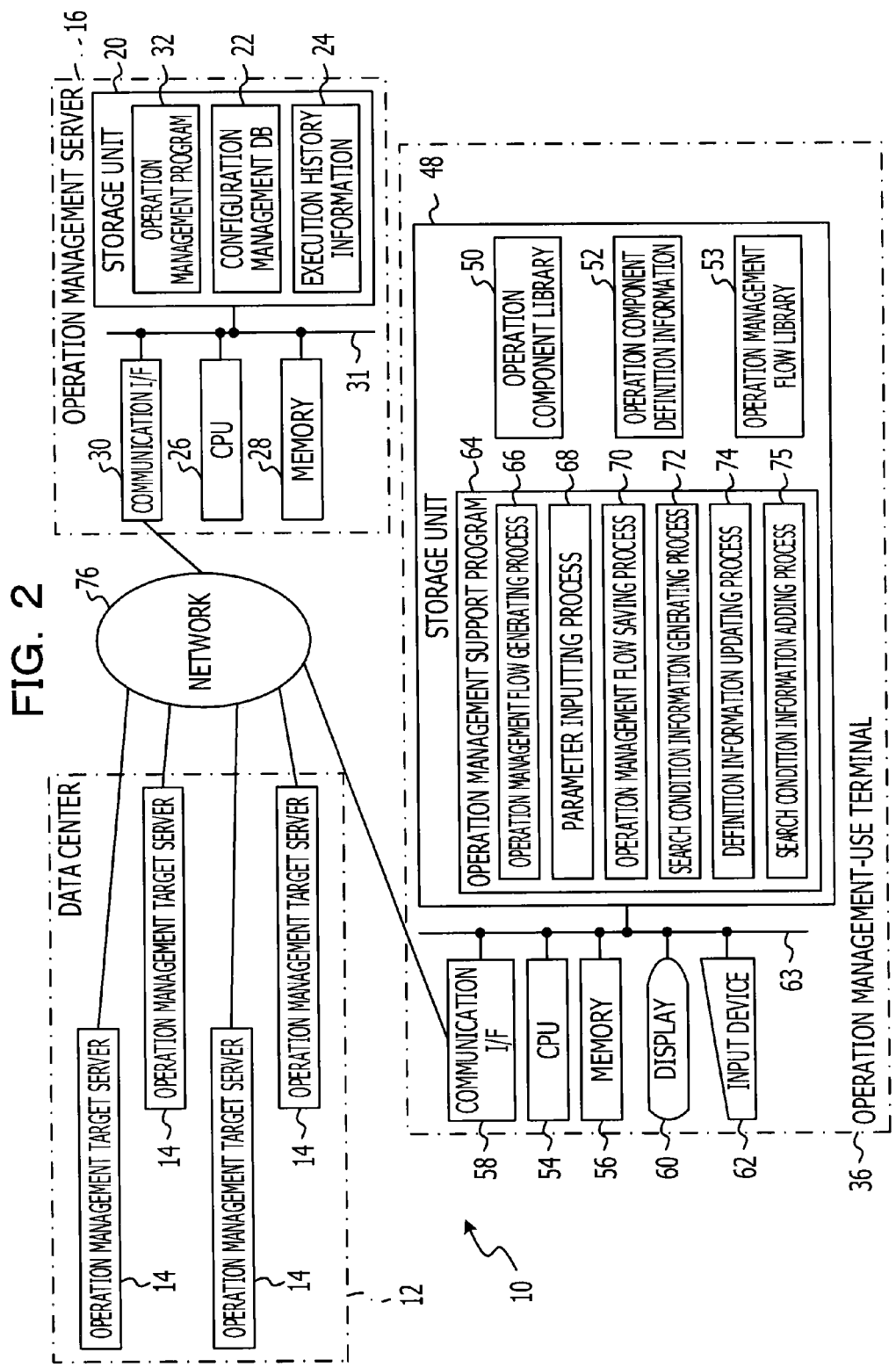
FIG. 2 is a block diagram illustrating a schematic configuration of the computer system.

As illustrated in FIG. 2, the operation management server 16 includes a central processing unit (CPU) 26, a memory 28, a nonvolatile storage unit 20, and a communication I/F unit 30. The CPU 26, the memory 28, the storage unit 20, and the communication I/F unit 30 are mutually coupled via a bus 31. In the storage unit 20, programs of an operating system and application programs are stored (not illustrated), an operation management program 32 is stored, and also the configuration management database 22 and the execution history information 24 are stored. The CPU 26 of the operation management server 16 operates as the operation management unit 18 illustrated in FIG. 1 by executing the operation management program 32.

The operation management-use terminal 36 includes a CPU 54, a memory 56, the nonvolatile storage unit 48, a communication I/F unit 58, a display 60, and an input device 62. The CPU 54, the memory 56, the storage unit 48, the communication I/F unit 58, the display 60, and the input device 62 are mutually coupled via a bus 63. In the storage unit 48, programs of an operating system and application programs are stored (not illustrated), an operation management support program 64 is stored, and also the operation component library 50 and the operation component definition information 52 are stored.

The operation management support program 64 includes an operation management flow generating process 66, a parameter inputting process 68, an operation management flow saving process 70, a search condition information generating process 72, a definition information updating process 74, and a search condition information adding process 75. The CPU 54 of the operation management-use terminal 36 operates as the operation management flow generating unit 38 illustrated in FIG. 1 by executing the operation management flow generating process 66. The CPU 54 operates as the parameter inputting unit 40 illustrated in FIG. 1 by executing the parameter inputting process 68. The CPU 54 operates as the operation management flow saving unit 42 illustrated in FIG. 1 by executing the operation management flow saving process 70. The CPU 54 operates as the search condition information generating unit 44 illustrated in FIG. 1 by executing the search condition information generating process 72. The CPU 54 operates as the definition information updating unit 46 illustrated in FIG. 1 by executing the definition information updating process 74. The CPU 54 operates as the search condition information adding unit 47 illustrated in FIG. 1 by executing the search condition information adding process 75. Note that the operation management support program 64 is an example of an operation management support program according to the disclosed technique.

Then, the operation of this embodiment will be described. In this embodiment, a user appropriately combines a plurality of types of operation management components registered in the operation component library 50 so as to create an operation management flow with which desired operation management actions are carried out, and causes the operation management server 16 to execute the created operation management flow. Thereby, desired operation management actions are carried out on the operation management target server 14.

However, some operation management components acquire configuration information from the configuration management database 22 and use it for operation management actions. Search condition information used for acquisition of the configuration information from the configuration management database 22 is expressed in a notation compliant with XPath. Accordingly, in order to create or modify search condition information, a user has to have knowledge of XPath and an understanding of the structure of the configuration management database 22, and therefore it has taken much time and effort to create an operation management flow.

In view of the above, in this embodiment, when an operation management flow is created or modified by a user, processing of generating search condition information for searching for configuration information in which a parameter input by the user is set as attribute information is performed by the search condition information generating unit 44.

Hereinafter, the details of processing performed in the operation management-use terminal 36 of the computer system 10 will be described. When instructed by a user via the input device 62 to create or modify an operation management flow, the operation management-use terminal 36 performs operation management support processing illustrated in FIG. 3.

In step 100 of the operation management support processing, the operation management flow generating unit 38 performs operation management flow creation processing for supporting the creation or modification of the operation management flow to be made by the user. That is, the operation management flow generating unit 38 first displays the operation management flow creation screen 80 as illustrated in FIG. 4 on the display 60. The operation management flow generating unit 38 then arranges the operation components 82 selected by the user from among the operation components 82 registered in the operation component library 50 on the operation management flow creation screen 80. Further, the operation management flow generating unit 38 draws a line which couples the operation components 82 arranged on the operation management flow creation screen 80 in accordance with an instruction from the user.

Thus, an operation management flow as illustrated in FIG. 4 is created. Note that, regarding operation management actions implemented by the operation management flow illustrated in FIG. 4, upon start-up of the flow, first, acquisition of configuration information of the operation management target server 14 from the configuration management database 22 is attempted by using the operation component 82 with the wording "Acquire configuration information". If configuration information is successfully acquired, start-up of the operation management target server 14 is attempted using the acquired configuration information by using the operation component 82 with the wording "Start up server". Then, if the operation management target server 14 is successfully started, "Start-up success" is output as a result of the operation management action. Otherwise, if the configuration information of the operation management target server 14 fails to be acquired or if the operation management target server 14 fails to start up, "Startup failure" is output as a result of an operation management action.

Note that, in the case of modifying an operation management flow, the operation management flow generating unit 38 displays an operation management flow read from the library 53 on the operation management flow creation screen 80 displayed on the display 60. Then, the operation management flow generating unit 38 performs processing such as adding an operation component to the operation management flow or changing the operation component, or adding or changing a connection line, in response to a user's instruction. In this way, modification of the operation management flow is achieved.

In the next step, 102, the parameter inputting unit 40 performs processing of supporting the input of a parameter for an operation component which uses information of the configuration management database 22 among operation components included in the operation management flow created by the user. That is, regarding the operation component 82 which uses information of the configuration management database 22, the parameter inputting unit 40 displays the parameter input screen 84 as illustrated in FIG. 5A on the display 60.

For example, in the operation management flow illustrated in FIG. 4, the operation component 82 with the wording "Start up server" attempts to start up the operation management target server 14 using configuration information acquired by using the operation component 82 with the wording "Acquire configuration information". Therefore, when the operation management flow illustrated in FIG. 4 is created, the parameter inputting unit 40 displays the parameter input screen 84 corresponding to the operation component 82 with the wording "Start up server" on the display 60.

If, in the created operation management flow, it is assumed that an operation management action targeting some of the servers 14 would be carried out, a user inputs a parameter specifying the servers 14 targeted for operation management via the parameter input screen 84 displayed on the display 60. For example, if it is assumed in the operation management flow illustrated in FIG. 4 that the servers 14 on which Windows (registered trademark) is running as the OS would be started up, a user inputs a parameter of "Windows (registered trademark)" into an input field of "ostype" of the parameter input screen 84 as illustrated in FIG. 5B. Upon input of the parameter by the user via the parameter input screen 84, the parameter input unit 40 performs processing which stores the input parameter in association with the corresponding operation component in the memory 56 or the like.

In the next step, 104, the operation management flow saving unit 42 performs operation management flow saving processing in which the operation management flow created by the user is saved in the storage unit 48 by registering it in the operation management flow library 53.

In the next step, 106, and thereafter, for the operation component which uses configuration information of the configuration management database 22, the search condition information generating unit 44 generates search condition information for searching for configuration information to be used. That is, first, in step 106, the search condition information generating unit 44 sets a variable i for identifying each operation component to 1. Then, in the next step, 108, the search condition information generating unit 44 takes out an i-th operation component as a target for processing from the operation management flow created by the user. In the next step, 109, the search condition information generating unit 44 determines whether the operation component being processed which has been taken out in step 108 is an operation component to which the parameter has been input by the user. If the determination of step 109 is negative, the process proceeds to step 126.

Otherwise, if the determination of step 109 is affirmative, the process proceeds to step 110. In step 110, the search condition information generating unit 44 refers to the definition information 52 of the operation component being processed. Then, a determination is made as to whether the association of the parameter of the operation component being processed with the attribute of a configuration item (CI) of the configuration information registered in the configuration management database 22 is defined in the definition information 52 referred to.

Figure 7:
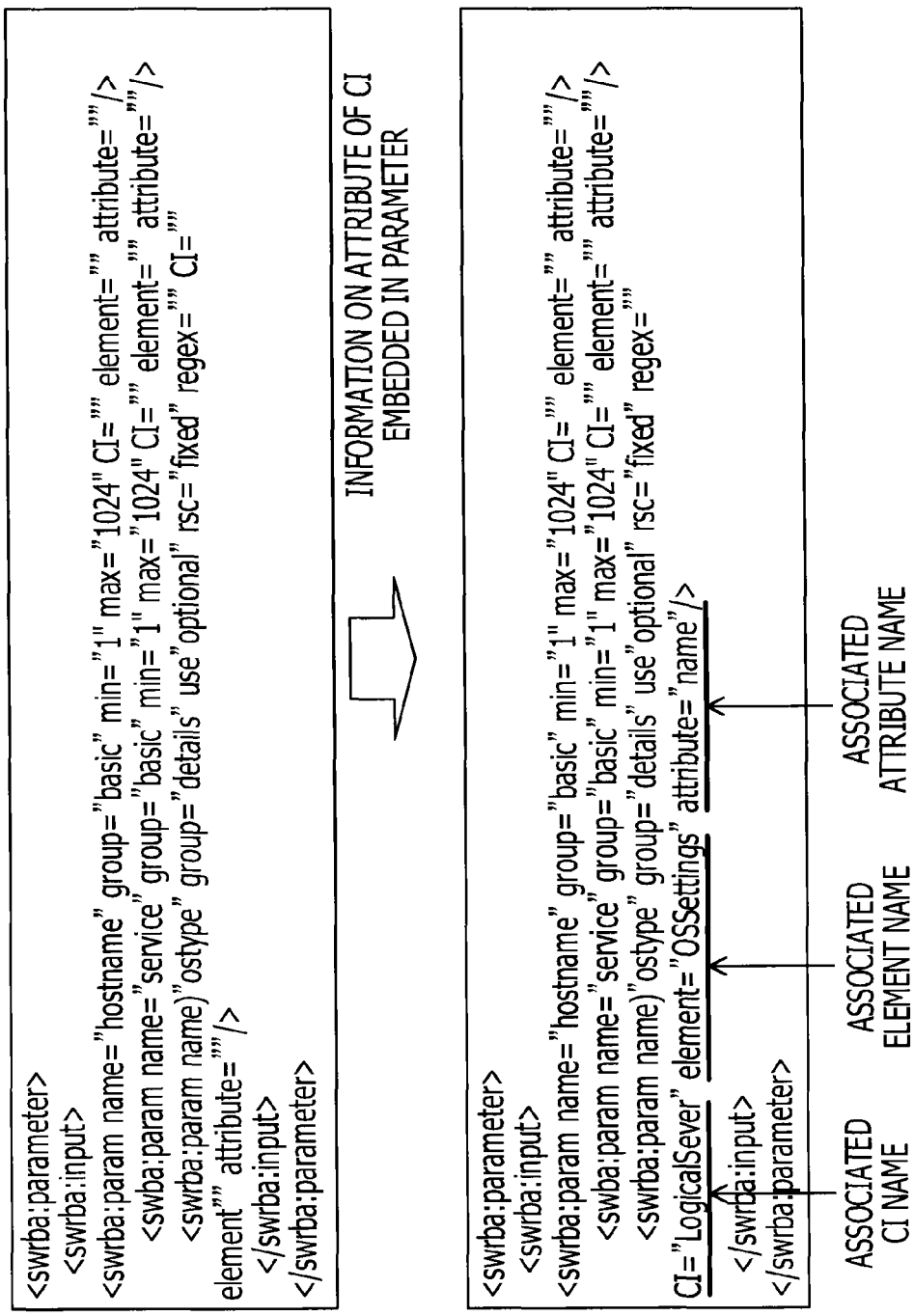
FIGS. 7A and 7B are images each illustrating an example content of operation component definition information.

FIGS. 7A and 7B each illustrate an example of the operation component definition information 52. Among these, association information defining the association of parameters with the attribute of CI of configuration information registered in the configuration management database 22 illustrated by way of example in FIG. 6 is included in the example of the operation component definition information 52 illustrated in FIG. 7B. The association information in FIG. 7B is the underlined portions illustrated in FIG. 7B (CI="LogicalServer", element="OSSetting", attribute="name"). Regarding an operation component which is originally registered in the operation component library 50 and is provided to a user, the above-mentioned association is defined in advance in the corresponding operation component definition information 52. In this case, a determination in step 110 is affirmative, and the process proceeds to step 118.

In step 118, the search condition information generating unit 44 acquires information which associates a parameter of the operation component with the attribute of CI of configuration information registered in the configuration management database 22 from the definition information 52 of the operation component being processed. In the next step, 120, the search condition information generating unit 44 performs search condition analysis processing. The details of the search condition analysis processing will be described with reference to FIG. 8.

In step 140 of the search condition analysis processing, the search condition information generating unit 44 acquires model information of a CI associated with the parameter of the operation component among the configuration information registered in the configuration management database 22. The configuration information registered in the configuration management database 22 is information expressed in Extensible Markup Language (XML), and an example thereof as illustrated in FIG. 6 is acquired by processing of step 140.

In the next step, 142, the search condition information generating unit 44 acquires element information at the head (top layer) of the model information acquired in step 140. For example, when the model information acquired in step 140 is the information illustrated in FIG. 6, "LogicalServer", which is element information at the top level of hierarchy, is acquired in step 142. In the next step, 144, the search condition information generating unit 44 saves the element information acquired in step 142 in the memory 56 or the like.

In the next step, 146, the search condition information generating unit 44 determines whether the element information acquired in step 142 is element information with which input parameter of the operation component is associated and is information in which the input parameter is set as attribute information. If the determining of step 146 is affirmative, the process proceeds to step 152; otherwise, if the determination of step 146 is negative, the process proceeds to step 148. In step 148, the search condition information generating unit 44 acquires element information corresponding to a child element of the element information acquired in the previous step, 142, among the model information acquired in step 140. For example, in the case where the model information acquired in step 140 is the information illustrated in FIG. 6, "SystemSettings", which is element information whose parent element is "LogicalServer" is acquired in step 148.

In the next step, 150, the search condition information generating unit 44 performs XML-schema child element analysis processing. The details of the XML-schema child element analysis processing will be described with reference to FIG. 9.

In step 160 of the XML-schema child element analysis processing, the search condition information generating unit 44 sets a variable j for identifying each piece of element information to 1. In the next step, 162, the search condition information generating unit 44 saves j-th element information, which has already been acquired, in the memory 56 or the like. In the next step, 164, the search condition information generating unit 44 determines whether the j-th element information saved in step 162 is element information with which input parameter of the operation component is associated and is information in which the input parameter is set as attribute information. If the determining of step 164 is affirmative, the XML-schema child element analysis processing is completed.

Figure 9:
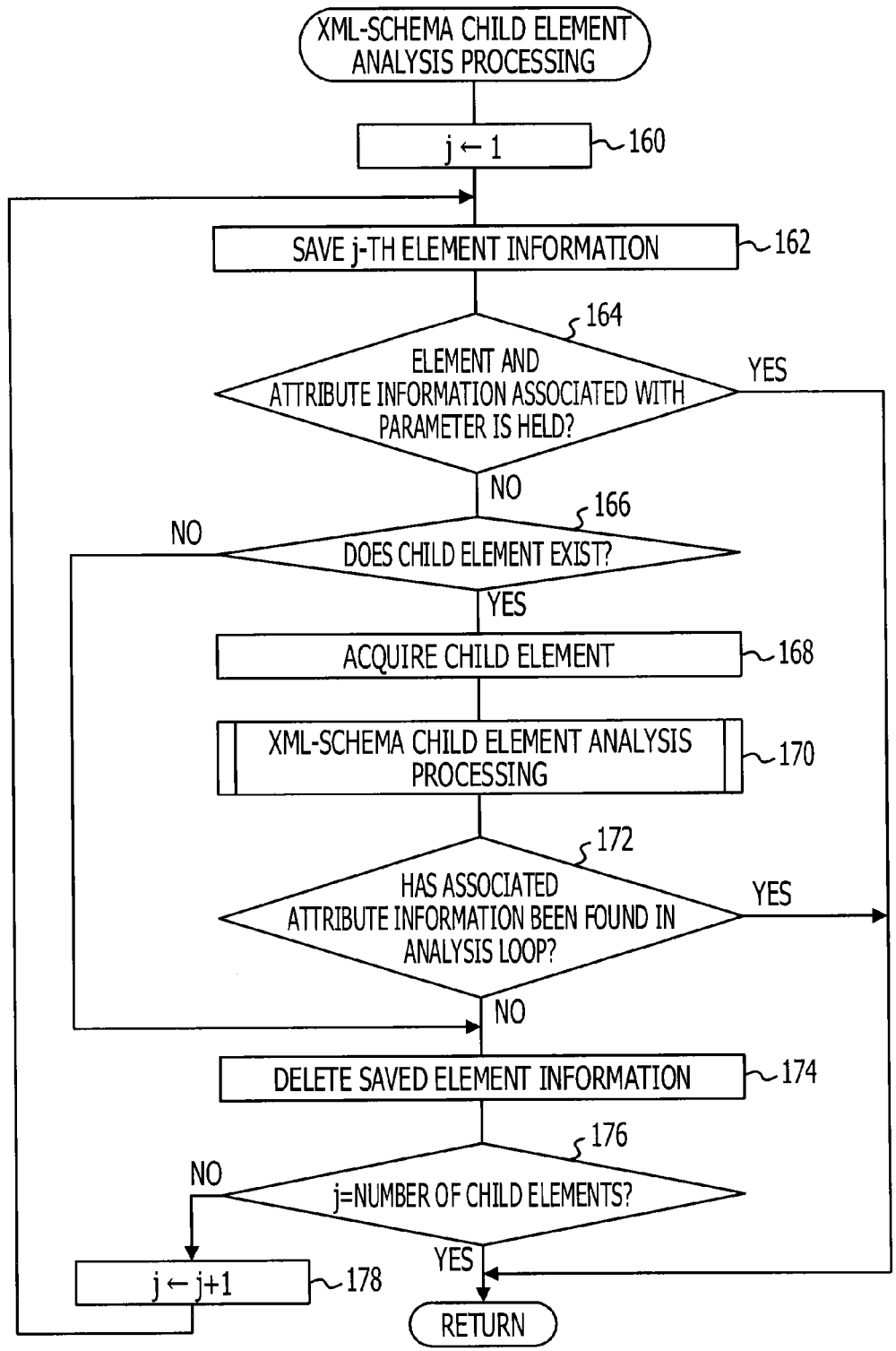
FIG. 9 is a flowchart illustrating example XML-schema child element analysis processing.

Otherwise, if the determination of step 164 is negative, the process proceeds to step 166. In step 166, the search condition information generating unit 44 determines whether there exists a child element in the j-th element information saved in the memory 56 or the like in step 162. If the determination of step 166 is negative, the process proceeds to step 174; otherwise, if the determination of step 166 is affirmative, the process proceeds to step 168. In step 168, the search condition information generating unit 44 acquires a child element of the j-th element information saved in the memory 56 or the like in step 162 from the previously acquired model information. Then, in the next step, 170, the search condition information generating unit 44 performs XML-schema child element analysis processing (FIG. 9).

As described above, in the XML-schema child element analysis processing, the search condition information generating unit 44 sequentially acquires a child element of the j-th element information and searches for element information with which the input parameter is associated and in which that input parameter is set as attribute information. The XML-schema child element analysis processing in step 170 is completed, and then the process proceeds to step 172. In step 172, the search condition information generating unit 44 determines whether element information with which the input parameter is associated and in which that input parameter is set as attribute information has been found in the analysis loop until this point. If the determining of step 172 is affirmative, the XML-schema child element analysis processing is completed.

Otherwise, if the determination of step 172 is negative, the process proceeds to step 174. In step 174, the search condition information generating unit 44 deletes the j-th element information and information of child elements of the j-th element information which have been saved in the memory 56 or the like until this point from the memory 56 or the like. In the next step, 176, the search condition information generating unit 44 determines whether the value of variable j has reached the total number of child elements of the element information at the head (top layer) of the model information. If the determination of step 176 is negative, the process proceeds to step 178; otherwise, if the determination of step 176 is affirmative, the XML-schema child element analysis processing is completed. In step 178, the search condition information generating unit 44 increments the value of variable j by 1, and the process returns to step 162.

By the XML-schema child element analysis processing mentioned above, if a user inputs a parameter of "Windows (registered trademark)" into an input field of "ostype" of the parameter input screen 84, for example, "LogicalServer", "SystemSettings", and "OSSetting" as element information are sequentially stored in the memory 56 or the like. Then, as the element information with which the input parameter is associated and in which that input parameter is set as attribute information, element information "name" will be stored in the memory 56 or the like.

Figure 8:
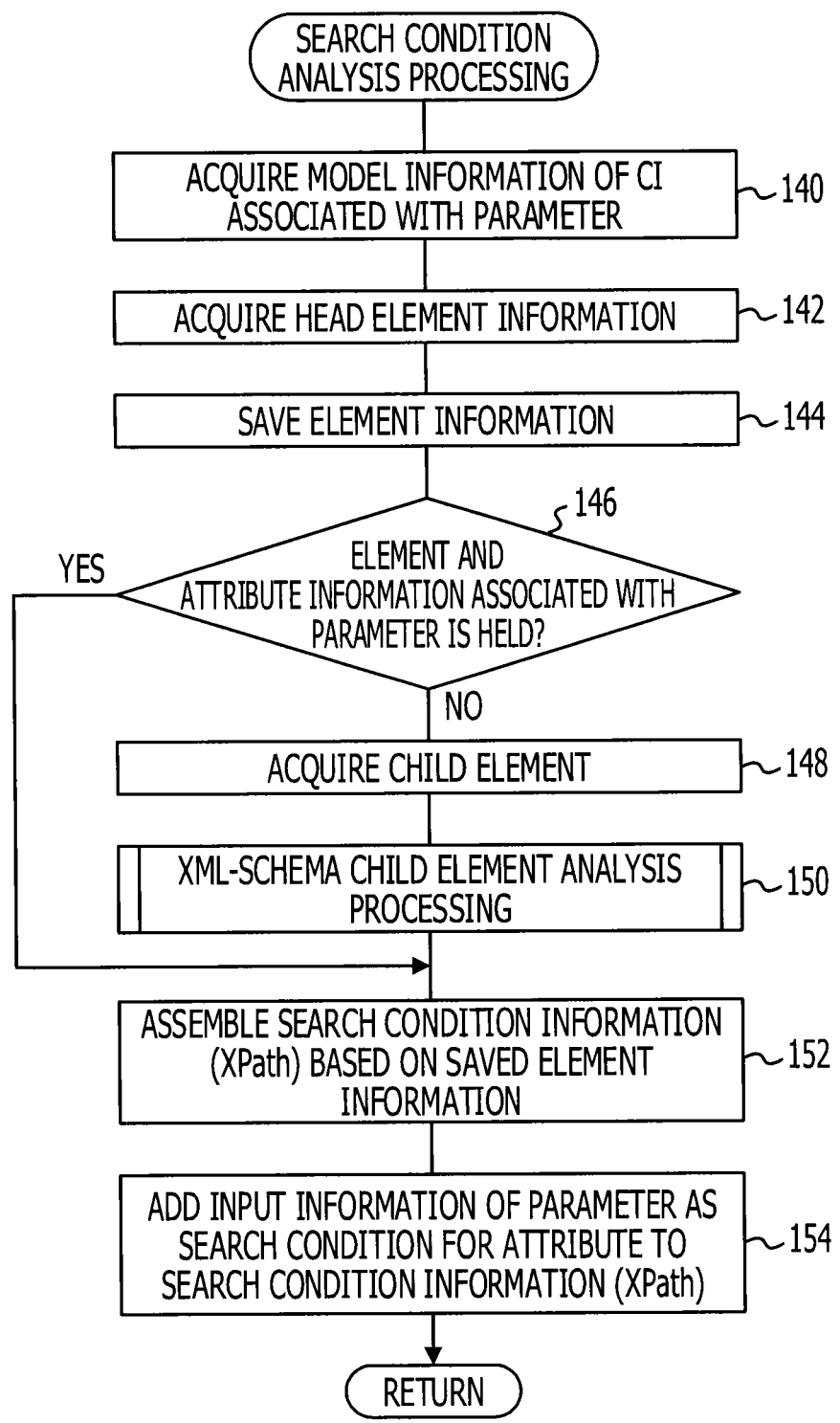
FIG. 8 is a flowchart illustrating example search condition analysis processing.

The XML-schema child element analysis processing is completed, and then the process proceeds to step 152 of the search condition analysis processing (FIG. 8). In step 152, based on element information saved in the memory 56 or the like, the search condition information generating unit 44 assembles search condition information in such a manner that a search condition for searching for element information in which the input parameter is set as attribute information is expressed in a notation compliant with XPath. Note that the assembling of search condition information mentioned above may be carried out by arranging element information saved in the memory 56 or the like sequentially in descending order of hierarchy and inserting a given mark (e.g., "/") between individual pieces of arranged element information, for example.

In the next step, 154, the search condition information generating unit 44 adds a parameter input by the user, as a search condition for element information in which the input parameter is set as attribute information, to the search condition information, and then the search condition analysis processing is completed. For example, if a user inputs a parameter of "Windows (registered trademark)" into an input field of "ostype" of the parameter input screen 84, search condition information for searching for configuration information in which "Windows (registered trademark)" has been set as attribute information of element information "name" is generated as illustrated in FIG. 10B. FIG. 10A illustrates an example of the configuration information registered in the configuration management database 22. As illustrated in FIG. 10A, by using the search condition information illustrated in FIG. 10B, element information is arranged in such a hierarchical manner as "LogicalServer/SystemSettings/OSSetting/name", and thus configuration information in which "Windows (registered trademark)" has been set as attribute information of "name" will be searched for.

Note that, in the search condition analysis processing mentioned above, when a plurality of parameters are input to the operation component being processed, a plurality of pieces of search condition information corresponding to the individual input parameters are generated.

Figure 3:
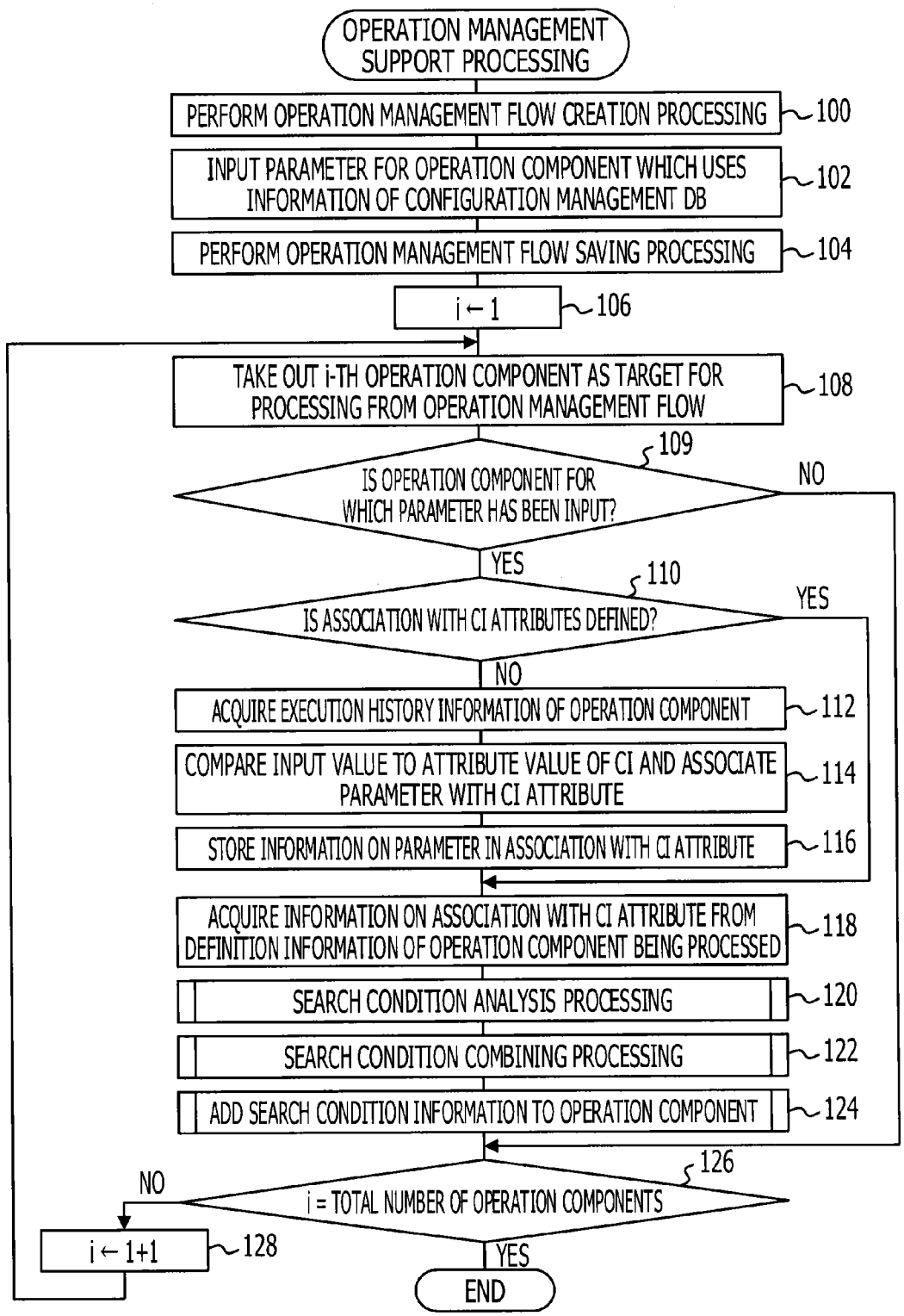
FIG. 3 is a flowchart illustrating example operation management support processing performed in an operation management-use terminal.

The search condition analysis processing is completed, and then the process proceeds to step 122 of the operation management support processing (FIG. 3). In step 122, the search condition information generating unit 44 performs search condition combining processing. The details of the search condition combining processing will be described with reference to FIG. 11.

In step 190 of the search condition combining processing, the search condition information generating unit 44 determines whether a plurality of pieces of search condition information compliant with XPath are created for the operation component being processed. If the determination of step 190 is negative, the search condition combining processing is completed; otherwise, if the determination of step 190 is affirmative, the process proceeds to step 192. In step 192, the search condition information generating unit 44 sets a variable k for counting the number of pieces of search condition information to 1.

In the next step, 194, the search condition information generating unit 44 determines whether the CI types of a pair of pieces of search condition information to be combined (k-th search condition information and (k+1)-th search condition information) are the same. For example, a case is considered where a user inputs parameters into input fields of "ipmiusername" and "ipmipassword" of the parameter input screen 84 illustrated in FIG. 12A, respectively, and both pieces of element information corresponding to "ipmiusername" and "ipmipassword" are associated with element information "LogicalServer". In this case, the determining of step 194 is affirmative, and the process proceeds to step 196. In step 196, the search condition information generating unit 44 generates search condition information in which the pair of pieces of search condition information as a target for combination are combined by using a character string of "and" as illustrated by way of example in FIG. 12B.

For example, a case is considered where a user inputs parameters into input fields of "mwtype" and "ostype" of the parameter input screen 84 illustrated in FIG. 13A, respectively, and both pieces of element information corresponding to "mwtype" and "ostype" are associated with different pieces of element information. FIG. 13A illustrates an example in which the element information corresponding to "mwtype" is associated with element information "InstalledSoftware", and the element information corresponding to "ostype" is associated with element information "LogicalServer". In this case, the determination of step 194 is negative, and the process proceeds to step 198. In step 198, the search condition information generating unit 44 generates search condition information in which search condition information as a target for combination are combined by using a character string of "&" as illustrated by way of example in FIG. 13B.

In the next step, 200, the search condition information generating unit 44 determines whether the variable k has reached a value obtained by subtracting 1 from the number of pieces of search condition information. If the determination of step 200 is negative, the process proceeds to step 202. In step 202, the search condition information generating unit 44 increments the variable k by 1, and the process returns to step 194. If the determination of step 200 is affirmative, the search condition combining processing is completed.

By the search condition combining processing mentioned above, even when a plurality of parameters are input for the operation component being processed and a plurality of pieces of search condition information corresponding to individual parameters are generated, a plurality of pieces of search condition information are combined into a single piece of search condition information compliant with XPath.

The search condition combining processing is completed, and then the process proceeds to step 124 of the operation management support processing (FIG. 3). In step 124, the search condition information adding unit 47 adds search condition information generated through the above-mentioned processing to an operation component for acquiring configuration information from the configuration management database 22, of the operation management flow which has been created by the user and is stored in the library 53. For example, in the operation management flow illustrated in FIG. 4, when search condition information is generated under a condition that the operation component 82 of "Start up server" is being processed, the generated search condition information is added to the operation component 82 of "Acquire configuration information" arranged prior to the operation component 82 being processed.

In the next step, 126, the search condition information generating unit 44 determines whether the value of variable i has reached the total number of the operation components contained in the operation management flow. If the determination of step 126 is negative, the process proceeds to step 128. In step 128, the search condition information generating unit 44 increments the variable i by 1, and the process returns to step 108. The processing of step 108 to step 128 is repeated until the determination of step 126 becomes affirmative. If the determination of step 126 is affirmative, the operation management support processing is completed.

In the foregoing, processing in the case where the association of the parameter input by the user with the attribute of CI of configuration information is defined in the operation component definition information 52 has been described. In this case, as illustrated in FIG. 14, search condition information is obtained by (1) acquiring association information with respect to the attribute of CI from the operation component definition information 52, (2) creating XPath (search condition information) for searching for the corresponding attribute, and (3) combining the created XPath (search condition information) together.

Otherwise, in this embodiment, a user may create an operation component. Regarding the operation component created by a user, there is a possibility that the association of a parameter with the attribute of CI of configuration information registered in the configuration management database 22 is not defined in the operation component definition information 52 (refers also to FIG. 7A). In this case, association information between the parameter input by the user and the attribute of CI is not able to be acquired from the operation component definition information 52. Hereinafter, processing in the case where the association of a parameter with the attribute of CI of configuration information is not defined in the operation component definition information 52 will be described.

If the association of a parameter with the attribute of CI of configuration information is not defined in the operation component definition information 52, a determination of step 110 of the operation management support processing (FIG. 3) is negative, and the process proceeds to step 112. In step 112, the definition information updating unit 46 acquires the execution history information 24 of the operation component being processed from the operation management server 16. As illustrated by way of example in FIG. 15, in the execution history information 24, parameters ("Windows (registered trademark)" and "Linux (registered trademark)" in the example of FIG. 15) which have been input when some operation component has previously been used are registered. Note that, the execution history information 24 is also used when an operation component being processed is in an operation management flow other than the operation management flow created this time and, in the case of the different operation management flow concerned, the search condition information manually created is stored if it is added to the operation component being processed.

In the next step, 114, the definition information updating unit 46 compares the input parameter registered in the execution history information 24 acquired in step 112 to attribute information set for each CI of the configuration information registered in the configuration management database 22. The definition information updating unit 46 also extracts a CI in which the input parameter registered in the execution history information 24 is set as attribute information, among individual CIs of the configuration information registered in the configuration management database 22. Then, the definition information updating unit 46 reads the operation component definition information 52 of the operation component being processed from the storage unit 48, and adds information for associating the parameter of the operation component being processed with the attribute of the extracted CI to the read operation component definition information 52. This causes the operation component definition information 52 to be updated from the operation component definition information 52 in which the association of a parameter with the attribute of CI of configuration information is not defined as illustrated in FIG. 7A to the operation component definition information 52 in which the parameter is associated with the attribute of CI of configuration information as illustrated in FIG. 7B.

Then, in the next step, 116, the definition information updating unit 46 stores in the storage unit 48 the operation component definition information 52 to which the information for associating the parameter of the operation component being processed with the attribute of the extracted CI has been added. After processing of step 116 has been performed, the process proceeds to step 118, and the subsequent processing is the same as in the case where the association of a parameter with the attribute of CI of configuration information is defined in the operation component definition information 52.

As such, when the association of a parameter with the attribute of CI of configuration information is not defined in the operation component definition information 52, as illustrated in FIG. 16, (1) a parameter previously input for the operation component is acquired from the execution history information 24. Then, (2) based on the previously input parameter, the parameter is associated with the attribute of CI, and (3) information on the associated parameter is stored in the operation component definition information 52. Subsequently, (4) association information with respect to the attribute of CI is acquired from the operation component definition information 52, (5) XPath (search condition information) for searching for the corresponding attribute is created, and (6) the created XPath (search condition information) is combined together. Thus, search condition information is obtained.

The operation management flow created by the operation management support processing described above is thereafter read from the library 53 and is uploaded to the operation management server 16. Then, in the operation management server 16, various types of operation management actions on the operation management target serves 14 would be performed by the operation management unit 18 in accordance with the uploaded operation management flow.

It is to be noted that although the embodiment in which the search condition information compliant with XPath is generated has been described above, the disclosed technique is not limited to this and is also applicable to cases where search condition information compliant with standards other than XPath is generated.

Moreover, although the embodiment in which the operation management-use terminal 36 for creating an operation management flow is provided separately from the operation management server 16 has been described above, the disclosed technique is not limited to this. For example, creation of an operation management flow and operation management actions in accordance with the created operation management flow may be implemented by a single information processing apparatus.

Moreover, although the embodiment in which the configuration information registered in the configuration management database 22 is information expressed in XML has been described above, the disclosed technique is not limited to this and the configuration information may be information which is compliant with standards other than XML.

Moreover, although the embodiment in which the operation management support program is stored (installed) in advance in the storage unit 48 of the operation management-use terminal 36 has been described above, the disclosed technique is not limited to this. The operation management support program according to the disclosed technique may also be recorded on a recording medium, such as a CD-ROM or DVD-ROM.

All the documents, patent applications, and technical standards described herein are incorporated herein by reference to the same extent as if each individual document, application or standard was for example and individually indicated to be incorporated herein by reference.

According to the above-described embodiment, effort for creating an operation management flow by combining operation management components may be reduced, and thus creation time may be shortened.

All examples and conditional language recited herein are intended for pedagogical purposes to aid the reader in understanding the invention and the concepts contributed by the inventor to furthering the art, and are to be construed as being without limitation to such for example recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An operation management support device comprising:
a memory configured to store a program; and
a processor coupled to the memory and configured to:
create an operation management flow to include a combination of operation management components for performing operation management actions on an information processing apparatus,
determine, whether a parameter specifying a search condition for searching for a specific piece of configuration information of the information processing apparatus from a configuration management database is set for the operation management component included in the created operation management flow,
acquire from the configuration management database, based on the set parameter, an arrangement of element information included in the configuration information of the information processing apparatus, the element information corresponding to information in which the parameter is settable as an attribute information,
generate, based on the acquired arrangement of element information, search condition information for searching for the configuration information in which the parameter is set as attribute information, and
add the generated search condition information to the operation management component included in the created operation management flow, wherein the configuration information of the information processing apparatus registered in the configuration management database has such a structure that the element information is arranged hierarchically, and wherein the processor is configured to generate the search condition information by repeating the acquiring of the element information included in the configuration information of the information processing apparatus registered in the configuration management database and corresponding to the parameter set for the operation management component in descending order of hierarchy until the element information in which the parameter is settable as attribute information is acquired, assembling the acquired element information into an arrangement, and setting the parameter as a search condition for attribute information of element information in which the parameter is settable as the attribute information.

2. The operation management support device according to claim 1, comprising:
a first storage configured to store operation component definition information including information which specifies the element information corresponding to the parameter set for the operation management component among the configuration information of the information processing apparatus registered in the configuration management database, and wherein the processor is configured to acquire the element information specified in the operation component definition information stored in the first storage, as the element information corresponding to the parameter set for the operation management component, in descending order of hierarchy.

3. The operation management support device according to claim 2, comprising:
a second storage configured to store execution history information having registered therein the parameter which has been used during a given operation management action previously performed on the information processing apparatus targeted for operation management by using the operation management component, wherein the processor is configured to determine, based on the information specifying the element information corresponding to the parameter set for the operation management component among the configuration information not being included in the operation component definition information stored in the first storage, the element information corresponding to the parameter among the configuration information by checking the parameter registered in the execution history information stored in the second storage against attribute information of each piece of the element information included in the configuration information, and update the operation component definition information such that information specifying the determined element information as the element information corresponding to the parameter is included in the operation component definition information stored in the first storage.

4. The operation management support device according to claim 1, wherein based on a plurality of types of parameters being input for the operation management component, the processor is configured to generate the search condition information by generating each of a plurality of pieces of search condition information for searching for configuration information in which each of the parameters is set as attribute information, and couple the plurality of pieces of generated search condition information by using given connection information.

5. The operation management support device according to claim 1, wherein the processor is configured to generate search condition information expressed in a notation compliant with an XPath standard as the search condition information.

6. An operation management support method comprising:
creating an operation management flow to include a combination of operation management components for performing operation management actions on an information processing apparatus;
determining, whether a parameter specifying a search condition for searching for a specific piece of configuration information of the information processing apparatus from a configuration management database is set for the operation management component included in the created operation management flow;
acquiring from the configuration management database, based on the set parameter, an arrangement of element information included in the configuration information of the information processing apparatus, the element information corresponding to information in which the parameter is settable as an attribute information;
generating, based on the acquired arrangement of element information, search condition information for searching for the configuration information in which the parameter is set as attribute information; and
adding the generated search condition information to the operation management component included in the created operation management flow, wherein the configuration information of the information processing apparatus registered in the configuration management database has such a structure that the element information is arranged hierarchically, and the element information is included in the configuration information of the information processing apparatus registered in the configuration management database, and wherein the search condition information is generated by repeating the acquiring of the element information corresponding to the parameter set for the operation management component in descending order of hierarchy until the element information in which the parameter is settable as attribute information is acquired, assembling the acquired element information into an arrangement, and setting the parameter as a search condition for attribute information of element information in which the parameter is settable as the attribute information.

7. The operation management support method according to claim 6, comprising storing, in a first storage unit, operation component definition information including information which specifies the element information corresponding to the parameter set for the operation management component among the configuration information of the information processing apparatus registered in the configuration management database; and acquiring the element information specified in the operation component definition information stored in the first storage unit, as the element information corresponding to the parameter set for the operation management component, in descending order of hierarchy.

8. The operation management support method according to claim 7, comprising storing, in a second storage unit, execution history information having registered therein the parameter which has been used during a given operation management action previously performed on the information processing apparatus targeted for operation management by using the operation management component;

determining, based on the information specifying the element information corresponding to the parameter set for the operation management component among the configuration information not being included in the operation component definition information stored in the first storage unit, the element information corresponding to the parameter among the configuration information by checking the parameter registered in the execution history information stored in the second storage unit against attribute information of each piece of the element information included in the configuration information; and updating the operation component definition information such that information specifying the determined element information as the element information corresponding to the parameter is included in the operation component definition information stored in the first storage unit.

9. The operation management support method according to claim 6, comprising generating, based on a plurality of types of parameters being input for the operation management component, the search condition information by generating each of a plurality of pieces of search condition information for searching for configuration information in which each of the parameters is set as attribute information; and coupling the plurality of pieces of generated search condition information by using given connection information.

10. The operation management support method according to claim 6, wherein search condition information expressed in a notation compliant with an XPath standard is generated as the search condition information.

11. A non-transitory computer-readable recording medium having stored therein a program for causing a device to execute a process comprising:

creating an operation management flow to include a combination of operation management components for performing operation management actions on an information processing apparatus;

determining, whether a parameter specifying a search condition for searching for a specific piece of configuration information of the information processing apparatus from a configuration management database is set for the operation management component included in the created operation management flow;

acquiring, from the configuration management database, based on the set parameter, an arrangement of element information included in the configuration information of the information processing apparatus, the element information corresponding to the information in which the parameter is settable as an attribute information;

generating, based on the acquired arrangement of element information, search condition information for searching for the configuration information in which the parameter is set as attribute information; and adding the generated search condition information to the operation management component included in the created operation management flow, wherein the configuration information of the information processing apparatus registered in the configuration management database has such a structure that the element information is arranged hierarchically, and the element information is included in the configuration information of the information processing apparatus registered in the configuration management database, and wherein the search condition information is generated by repeating the acquiring of the element information corresponding to the parameter set for the operation management component in descending order of hierarchy until the element information in which the parameter is settable as attribute information is acquired, assembling the acquired element information into an arrangement, and setting the parameter as a search condition for attribute information of element information in which the parameter is settable as the attribute information.

12. The non-transitory computer-readable recording medium according to claim 11, wherein the process further comprising:

storing, in a first storage unit, operation component definition information including information which specifies the element information corresponding to the parameter set for the operation management component among the configuration information of the information processing apparatus registered in the configuration management database; and acquiring the element information specified in the operation component definition information stored in the first storage unit, as the element information corresponding to the parameter set for the operation management component, in descending order of hierarchy.

13. The non-transitory computer-readable recording medium according to claim 12, wherein the process further comprising:

storing, in a second storage unit, execution history information having registered therein the parameter which has been used during a given operation management action previously performed on the information processing apparatus targeted for operation management by using the operation management component;

determining, when the information specifying the element information corresponding to the parameter set for the operation management component among the configuration information is not included in the operation component definition information stored in the first storage unit, the element information corresponding to the parameter among the configuration information by checking the parameter registered in the execution history information stored in the second storage unit against attribute information of each piece of the element information included in the configuration information; and updating the operation component definition information such that information specifying the determined element information as the element information corresponding to the parameter is included in the operation component definition information stored in the first storage unit.

14. The non-transitory computer-readable recording medium according to claim 11, wherein the process further comprising:

generating, based on a plurality of types of parameters being input for the operation management component, the search condition information by generating each of a plurality of pieces of search condition information for searching for configuration information in which each of the parameters is set as attribute information; and coupling the plurality of pieces of generated search condition information by using given connection information.

15. The computer-readable recording medium according to claim 11, wherein search condition information expressed in a notation compliant with an XPath standard is generated as the search condition information.

* * * * *